Patented Feb. 5, 1929.

1,700,778

UNITED STATES PATENT OFFICE.

CHARLES M. A. STINE, COLE COOLIDGE, AND EDMUND B. MIDDLETON, OF WILMINGTON, DELAWARE, ASSIGNORS TO E. I. DU PONT DE NEMOURS & COMPANY, OF WILMINGTON, DELAWARE, A CORPORATION OF DELAWARE.

PAINT AND VARNISH LIQUID AND PROCESS OF MAKING SAME.

No Drawing.   Application filed September 5, 1924.   Serial No. 736,017.

This invention relates to coating compositions or paint and varnish liquids in which rubber is incorporated with an oil preferably drying or semi-drying and has for its object certain improvements in the working properties of such coating compositions.

In co-pending application, Serial No. 681,648, filed December 19, 1923, methods have been disclosed for the preparation of coating compositions or paint and varnish liquids by combining solutions of unvulcanized rubber or caoutchouc with drying oils; therein is also disclosed the fact that films produced from such liquids, either with or without the incorporation of pigments, may be hardened by heating to relatively low temperatures for suitable periods of time; and further that the drying or hardening of such films may be promoted if desired by the incorporation of suitable metallic driers, curing agents, or vulcanizing agents and accelerators.

It has also been discovered that when metallic driers are employed in paint and varnish liquids containing unvulcanized rubber and drying oils, such liquids if allowed to stand more or less in contact with atmospheric oxygen, lose body or decrease in viscosity unless the drier content is kept below certain maximum limits. We have discovered, in addition, that when certain pigments are incorporated with such paint and varnish liquids in which the drier content has been so chosen that with moderate exposure to atmospheric oxygen the body or viscosity of the clear liquid remains satisfactory for coating purposes over a considerable period of time, the body or viscosity of the resulting paints or enamels decreases rapidly on moderate exposure to atmospheric oxygen—in other words, certain pigments apparently act as oxygen carriers and cause depolymerization of the rubber in somewhat the same manner as do metallic driers. This constitutes a very serious defect for if not overcome, such paints or enamels could only be used satisfactorily within one or two days after their preparation and would therefore be of little commercial or practical value. Unlike the situation which obtained in the case of metallic driers, it is impossible to reduce the pigment content to such an extent that the loss in body no longer occurs and at the same time retain desirable practical properties, particularly hiding power, when the material is used for coating purposes.

Working on the theory that the loss in body in such compositions is due to depolymerization of the rubber brought about by contact with atmospheric oxygen and that this reaction is accelerated by the presence of oxygen carriers such as metallic driers and certain pigments—we have discoverd that the addition of certain substances—particularly certain organic reducing agents and more specifically aromatic compounds containing one or more hydroxyl groups as, for example, hydroquinone,—apparently inhibit the transfer of oxygen, preventing the depolymerization of the rubber—and therefore the loss in body. This discovery that certain substances act as inhibitors in preventing the catalytic depolymerization of the rubber in such composition applies both to clear paint and varnish liquids containing rubber, drying oil and drier, as well as to paints or enamels made up by the incorporation of pigments or inert materials therewith.

The effect of hydroquinone as an inhibiting agent in clear varnish liquids containing unvulcanized rubber, drying oil and metallic driers is illustrated by the data given in Table I:

TABLE I.

Viscosity tests on clear rubber-oil varnish liquids.

| Sample No. | Amt. of drier as % Co. | Hydroquinone on basis of rubber content | Initial viscosity | Viscosity after standing— | | | |
|---|---|---|---|---|---|---|---|
| | | | | 1 day | 2 days | 5 days | 10 days |
| 1 | None. | None. | 2.0 | 2.0 | 2.0 | 2.0 | 2.0 |
| 2 | 0.003 | None. | 2.0 | 2.0 | 2.0 | 2.0 | 2.0 |
| 3 | 0.03 | None. | 1.4 | 0.9 | <0.5 | | |
| 4 | 0.03 | 5% | 1.4 | 1.4 | 1.4 | 1.4 | 1.4 |
| 5 | 0.05 | None. | 1.65 | <0.5 | | | |
| 6 | 0.05 | 5% | 1.65 | 1.65 | 1.65 | 1.65 | 1.65 |

The above varnish liquids all contained the proportion of 50 gallons of drying oil per 100 pounds of rubber and were thinned to the "initial viscosity" with volatile solvent. The drier used was cobalt linoleate, the amount being expressed as the % Co on the basis of weight of oil. The determinations of viscosities were made by the air-bubble test described by Messrs. H. A. Gardner and P. C. Holdt in The Paint Manufacturers'

Association Circular #178, using a set of standard tubes obtained from that laboratory. The figures represent the approximate absolute viscosities in poises at 25° C. Other well known methods could, of course, be employed.

The viscosity tests were made on samples of liquid stored at room temperature in 1 pint friction top paint cans of approximately 8 cm. diameter x 10 cm. depth internal dimensions, filled to about 75% of their capacity, and kept closed except for a period of about ten minutes each day, when they were opened, thoroughly stirred with a spatula and a sample tested for viscosity.

The above data are approximate only and are merely intended to illustrate the marked effect which hydroquinone has in retarding the loss in viscosity which normally occurs in the above described varnish liquids containing drier equivalent to 0.03 and 0.05% Co (on the basis of weight of oil) when more or less exposed to atmospheric oxygen. (Compare samples 3 and 5 with 4 and 6 respectively.) Sample No. 2 illustrates the fact that certain small amounts of drier may be employed in rubber-oil varnish liquids without effecting a loss in body when the liquid is more or less exposed to oxygen of the air.

From the above it is evident that the addition of a relatively small amount of an inhibiting agent, such as hydroquinone, to clear rubber-oil varnish liquid such as have been hereinbefore described, permits the employment of appreciably larger amounts of drier than could otherwise be used without changes in viscosity occurring to an undesirable extent within a relatively short time.

In Table II data are given which illustrate the changes in body which we have observed in several typical enamels prepared by the incorporation of certain pigments in rubber-oil varnish liquids of the type hereinbefore described and the effect which the incorporation of hydroquinone in such enamels has in retarding such viscosity changes.

TABLE II.

Viscosity tests on enamels prepared with rubber-oil vehicles.

| Sample No. | Description | Hydroquinone on basis of rubber content | Initial viscosity | Viscosity after standing— | | | |
|---|---|---|---|---|---|---|---|
| | | | | 5 days | 10 days | 15 days | 20 days |
| 1 | Medium gray | None | 276 | 315 | 201 | 160 | 110 |
| 2 | Medium gray | 5% | 329 | 260 | 241 | 236 | 235 |
| 3 | Delft blue | None | 427 | 288 | 154 | 90 | 40 |
| 4 | Delft blue | 5% | 305 | 287 | 256 | 242 | 237 |
| 5 | Dark blue | None | 358 | 135 | 83 | 50 | |
| 6 | Dark blue | 5% | 315 | 269 | 241 | 218 | 206 |

The liquid or vehicle portion of each of the above enamels contained the proportion of 50 gal. drying oil per 100 lbs. of rubber and cobalt linoleate as drier equivalent to 0.003% Co on the basis of weight of oil, and were thinned to the "initial viscosity" with volatile thinner.

The determinations of viscosity were made with a Scott viscosimeter as described in "White Paints and Painting Material" by W. G. Scott, pp. 440–441. The figures given in the table represent the number of seconds required for 50 cc. of the enamel to run through the viscosimeter at a temperature of 25° C. The tests were made on samples stored in 1 pint friction top cans opened daily for tests as described above for the clear varnish liquids. In this series of tests the sample used for the viscosity test was poured back into the container after each test.

As has already been brought out, the rubber-oil vehicles used in the preparation of these enamels when more or less exposed to atmospheric oxygen, as previously described, undergo very little or no change in viscosity. As has been mentioned, however, and as will be observed from the above data, the incorporation of certain pigments with these vehicles results in a fairly rapid loss of body. In other words, such pigments apparently behave as oxygen carriers and accelerate the catalytic depolymerization of the rubber in somewhat the same manner as do metallic driers. Not all pigments behave in this manner, although in our experience most of the common pigments do to a greater or less extent. The above given data illustrate the manner in which hydroquinone retards such viscosity changes, although it will be noted that such changes are not prevented entirely.

In both of the above tabulations, the amount of hydroquinone employed is indicated as being 5% on the basis of the rubber content, that is, 5 grams of hydroquinone per 100 grams of rubber contained in the composition. We have found that as much at 10 or 15% of hydroquinone (on the basis of rubber content) has no appreciably greater effect in stabilizing the hereinbefore described rubber-oil varnish liquids and enamels than 5%; also that as little as 1 or 2% is highly satisfactory for this purpose.

Although the examples given above are limited to maximum drier contents of 0.05% Co in the case of clear liquids and 0.003% Co in the case of the enamels, these are intended merely to illustrate specifically the effect of inhibiting agents such as hydroquinone and our intention is not confined to such drier contents, nor to the use of cobalt drier only. We have found for example that inhibiting agents are equally effective when much larger amounts of drier are employed—say, for example, equivalent to 0.1 or 0.2% Co on the basis of weight of oil. They are also effective when driers other than cobalt driers are used, for example lead and zinc driers.

Other substances than hydroquinone have likewise been found to be effective as inhibitors of the hereinbefore described viscosity changes of rubber-oil paint or varnish liquids, or paints or enamels made by the incorporation of pigments therewith. For example, pyrogallol is equally as effective as hydroquinone. Tannic acid has been found to have some value as an inhibitor, but is not so good as either hydroquinone or pyrogallol. Para-amino-phenol is a particularly good inhibitor from the standpoint of its solubility in certain thinners derived from petroleum.

It is to be understood also that although the use of crude or unvulcanized Hevea rubber is preferred in the practice of our invention, we do not wish to limit ourselves to this raw material, as other types of rubber can also be used with advantage, including botanical types, as balata, gutta percha, etc., also partly or wholly vulcanized rubber, including reclaim, etc. In the interpretation of our claims the term "rubber" is meant to include crude or unvulcanized caoutchouc, under which head may be included all the botanical varieties such as Hevea, balata, gutta percha, etc., and, as well, includes vulcanized rubber of any botanical variety in the state of partial vulcanization to the state of complete vulcanization, also reclaim, etc.

The term "oil" is used to cover animal, vegetable or mineral oils including all types as drying, semi-drying or non-drying oils, and as well, specially-treated oils; for example, blown or ozonized oils.

The term "inhibitor" covers those substances, for example, hydroquinone, para-amino-phenol, etc. which possibly function as reducing agents or in some other way thereby retard the rate of loss in viscosity of rubber mixtures, with or without oil, which is presumably brought about by depolymerization or deaggregation of the rubber, which such a rubber mixture, with or without metallic drier, may undergo in standing.

By the term "drier" is meant a salt of a metal such as cobalt, lead, manganese, etc., which functions probably as a carrier of oxygen, thereby catalyzing the oxidation of oil, and, as well, curing of rubber, doubtless by a somewhat similar process, bringing about through such reaction, usually, a loss in viscosity due to the depolymerization or deaggregation of the rubber.

As examples of pigments having, in conjunction with air, a marked viscosity-reducing effect on the liquid portion of the above described coating compositions, there may be mentioned (a) Ultra-marine blues;
(b) Iron blues in general, such as prussion blue;
(c) Zinc oxide; and
(d) Lead chromate pigments.

The pigment for medium gray referred to in Table II above, is a mixture of zinc oxide and lamp black, while delft blue and dark blue are obtained with certain proportions of ultra-marine blue.

When mixing the above ingredients, and particularly when mixing the rubber with the oil, we have found it to be important to avoid heating the rubber in the mixing operation, or afterwards, to temperatures much above 300° F. as has been customary in processes heretofore proposed. We have found that when heated to these high temperatures depolymerization, or other deleterious change in the rubber apparently occurs, with the result that films obtained with the rubber-oil combination are apt to remain sticky or tacky on drying, and are not at all durable or practicable as protective or decorative coatings. No such depolymerization occurs, however, if the mixing operation is performed at temperatures of, for example, below 200° F. We prefer in practice to mix the rubber solution, oil, etc., at normal room temperature, that is, between 65 and 85° F.

We claim:

1. The process which comprises mixing a solution of rubber with a substance of the class consisting of driers and pigments, (said substance being adapted, in the presence of air, to promote a reduction in the viscosity of said solution) and an aromatic hydroxy compound adapted to inhibit said viscosity reduction.

2. The process which comprises mixing a solution of rubber with a substance of the class consisting of driers and pigments, (said substance being adapted, in the presence of air, to promote a reduction in the viscosity of said solution) and a compound selected from a group consisting of hydroquinone, pyrogallol, para-amino phenol and tannic acid.

3. The process which comprises mixing 10 parts of unvulcanized rubber dissolved in a rubber solvent with from about 20 to 50 parts of a drying oil and cobalt drier up to about 0.1% Co on the basis of weight of oil, thinning with a volatile solvent to a suitable consistency for coating purposes and incorporating therein an amount of hydroquinone equivalent to from 1 to 10% of the weight of rubber contained in the composition.

4. The process which comprises mixing a solution of rubber in a rubber solvent with an oil and with a drier, thinning the mixture with a volatile solvent to a suitable consistency for use as a coating composition, and incorporating therein an aromatic hydroxy derivative adapted in the presence of a drier to decrease the rate of loss of body or viscosity on exposure to atmospheric oxygen.

5. The process as set forth in claim 4 in which the inhibitor is an organic compound selected from a group consisting of hydroquinone, pyrogallol, para-amino phenol and tannic acid.

6. The process as set forth in claim 4 in which the inhibitor is hydroquinone.

7. The process of counteracting the viscosity-reducing action of drier and pigment on the rubber-containing paint vehicle of a paint composition in the presence of air which comprises incorporating in said vehicle in addition to said drier and pigment an aromatic hydroxy compound with reducing properties capable of acting as an inhibitor of viscosity-reduction.

8. A process as defined in claim 7 in which the compound incorporated in the paint vehicle is an aromatic hydroxy compound selected from a group consisting of hydroquinone, pyrogallol, para-amino phenol and tannic acid.

9. A coating composition comprising a solution of rubber, a substance of the class consisting of driers and pigments adapted to function in the presence of air to promote a reduction in the viscosity of said solution and a hydroxy aromatic compound adapted to inhibit said viscosity reduction.

10. A composition comprising a solution of 10 parts of unvulcanized rubber in a rubber solvent, from about 20 to 50 parts of a drying oil, a substance of the class consisting of driers and pigments adapted in the presence of air to promote a reduction in the viscosity of a rubber solution and an amount of hydroquinone equivalent to from 1 to 10% of the weight of the rubber present, said composition containing sufficient volatile solvent to impart to it a suitable consistency for coating purposes.

11. A composition as defined in claim 10 which contains cobalt drier equivalent to 0.1% cobalt based on the weight of oil present.

12. A coating composition consisting essentially of rubber, a solvent therefor, an oil, a drier and a viscosity-reduction inhibitor comprising an organic compound selected from a group consisting of hydroquinone, pyrogallol, para-amino phenol and tannic acid.

13. A coating composition consisting essentially of rubber, a solvent therefor, an oil, a drier and a viscosity-reduction inhibitor comprising an aromatic hydroxy compound.

14. A coating composition consisting essentially of rubber, a solvent therefor, an oil, a drier and a viscosity-reduction inhibitor comprising a polyhydric phenolic compound.

15. A coating composition consisting essentially of rubber, a solvent therefor, an oil, a drier and a viscosity-reduction inhibitor comprising hydroquinone.

16. The composition as defined in claim 13 which also includes, as one of its constituents, a pigment.

17. The composition as defined in claim 15 which also includes, as one of its constituents, a pigment.

18. The composition as defined in claim 10 which also includes, as one of its constituents, a pigment.

In testimony whereof we affix our signatures.

CHARLES M. A. STINE.
COLE COOLIDGE.
EDMUND B. MIDDLETON.